April 30, 1957     R. O. LIGHTFOOT ET AL     2,790,461

FLUID FLOW CONTROL APPARATUS

Filed Dec. 18, 1950     2 Sheets-Sheet 1

RICHARD O. LIGHTFOOT
JACK M. ULANOVSKY
INVENTOR.

BY

ATTORNEY.

RICHARD O. LIGHTFOOT
JACK M. ULANOVSKY
INVENTOR.

BY Forrest J. Lilly
ATTORNEY.

2,790,461
FLUID FLOW CONTROL APPARATUS

Richard O. Lightfoot and Jack M. Ulanovsky, Los Angeles, Calif., assignors to Paddock Pool Equipment Co., Los Angeles, Calif., a corporation of California Application December 18, 1950, Serial No. 201,424

8 Claims. (Cl. 137—635)

This invention relates to fluid flow control apparatus. It particularly relates to multi-way control valve structures for variously connecting a plurality of fluid conveying conduits leading to fluid containers such as reservoirs, tanks and the like, to and from which the fluid is moved by pumps or by gravity. It is herein described, for the purpose of setting forth the nature of the invention, as used with a swimming pool equipped with a filter and a pump and having available a waste facility, such as a public sewer, a storage tank for irrigation water or a natural stream. As will be later pointed out, the invention is not limited to this type of application, nor is it limited to the control of the flow of water, or of liquids, but may be used in industrial establishments for the flow control of gaseous or other material capable of flowing movement.

In the usual swimming pool installation, the pool is supplied with water from a public supply or other available source. The water is pumped from the pool to a filter tank located at a convenient site near the pool where it is cleaned of impurities and returned to the pool. This operation is not a continuous one, but is periodically carried out for whatever interval of time is thought advisable by the operator. The operator therefore, manually controls the pump and the valve manipulation to effect these periodic filtering operations.

At other more infrequently recurring times, the pool is emptied of water, and filled with a fresh supply. On such occasions the valves controlling the flow of water through the several conduits of the pool system are manipulated to convey the water from the pool to the available waste facility, usually under the action of the pump, although in some installations this may be accomplished by gravity flow.

The filter tank accumulates a quantity of solid impurities which must be periodically removed to maintain the effectiveness of the filtering operation. The standard method for this cleaning of the filter is to pass relatively clean water through the filter in the reverse direction, and discharge the water loaded with the impurities of the filter into the waste facility. It is customary to use water from the pool for this cleansing duty. Here again various control valves must be set to move the water under the propelling action of the pump from the pool to the filter and thence to waste discharge.

When no one of the above described operations is transpiring, it may be desirable that a static condition of the water in the conduits be established so that certain maintenance operations, relating to the pumping device may be carried out.

It is one object of this invention to provide a flow control apparatus for a swimming pool or other installation of like character, by which the flow of water or other fluid may be selectively varied between the several facilities of the installation to accomplish different objectives. It is another object to accomplish this flow variation by a simple control unit, with a single manipulating device for use by the operator.

It is another object of the invention to provide a multi-way valve assembly with a minimum of operating parts, which shall serve to connect a plurality of ports in the assembly housing selectively, in any one of a number of different combinations to vary the flow route or routes through the assembly. It is also an object to provide for such a multi-way valve assembly a unitary control mechanism by which the operator can effect any one or any two of the possible flow routes, by different manipulations of the said one control mechanism.

It is an object of the invention to provide a valve assembly with a minimum number of valve stems, and valve bodies on the stems to connect a maximum number of ports in a variety of connecting arrangements. Specifically in the illustration of the invention set forth in the following description and in the drawings, five ports leading into the assembly housing are connected in four utility combinations by differently positioning only two valve stems. Each stem carries a valve body. Each valve body has two oppositely directed seating surfaces for engagement respectively with valve seats in two valve decks respectively at opposite ends of the range of movement of the valve body and valve stem. In the installation herein used to illustrate the invention four utility combinations of port connections are of value, but it is of course apparent that the valve structure shown is capable of being made to assume positions affording other port connections to provide other flow routes through the structure which might well have a utility value in other types of installation.

It is another object of the invention to provide a two valve stem structure capable of selective and differential operation of the two stems by a single lever or other manipulating element.

It is also an object of the invention to provide for accomplishing the above purposes a valve structure of the type characterized by the rectilinear movement of the valve bodies toward and away from the associated valve seats, as distinguished from a sliding movement of the valve bodies over the associated valve seats. Due to the abrasive particles often present in the fluid handled by valve structures, valves of the former type have greater wear resistance and longer life than those of the latter type.

Figure 1 of the drawings is a utility view of a swimming pool installation in which this invention is utilized, the swimming pool being shown in fragmentary vertical section;

Figure 1:
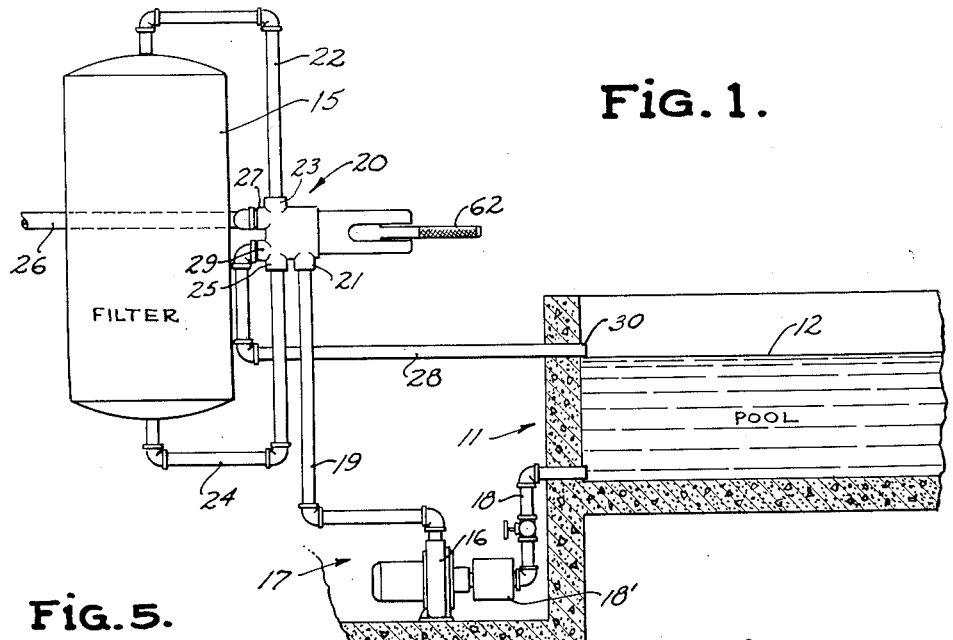

In Figure 1 is shown a swimming pool 11, in which water is standing at a level 12. A filter tank 15 is mounted in a location convenient to the pool. A motor driven centrifugal pump 16, installed in a pit 17, near the pool has its intake connected by a pipe 18 to the bottom of the pool, and has its outlet connected by a pipe 19 to a valve assembly 20 through a boss 21 of the assembly housing. A strainer 18' protects the pump from larger solid particles in the water coming from the pool.

The filter tank 15 is connected at its upper end by means of a pipe 22 to the valve assembly through a boss 23 of the assembly housing. The filter tank is connected at its lower end by a pipe 24 to the valve assembly through a boss 25 of the assembly housing. A waste or discharge pipe 26 which may lead to a sewer or other convenient disposal destination, is connected to the valve assembly 20 through a boss 27. A pipe 28 which is connected to the assembly housing through the boss 29 conducts water to the pool 11 discharging the water at the upper level of the pool at 30.

Figure 2:
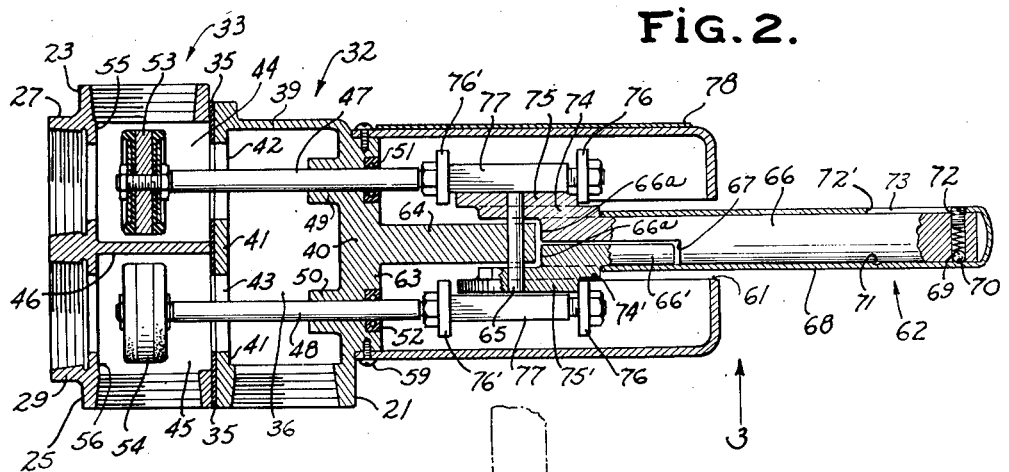
Figure 2 is a section view of the valve assembly of this invention taken along the line 2—2 of Figure 3, the valve bodies being shown in a non-utility unseated position for convenience of illustration of the structural character of the assembly.

Before proceeding to a discussion of the several functional operations of the system, and the flow conditions in the conduit pipes and other parts of the system for each operation, the construction of the valve assembly 20 will be considered. Referring to Figure 2, the housing of the assembly comprises two chambered castings 32 and 33 secured together by bolts 34. The planar joint between the castings is made leakproof by a gasket 35.

Figure 3:
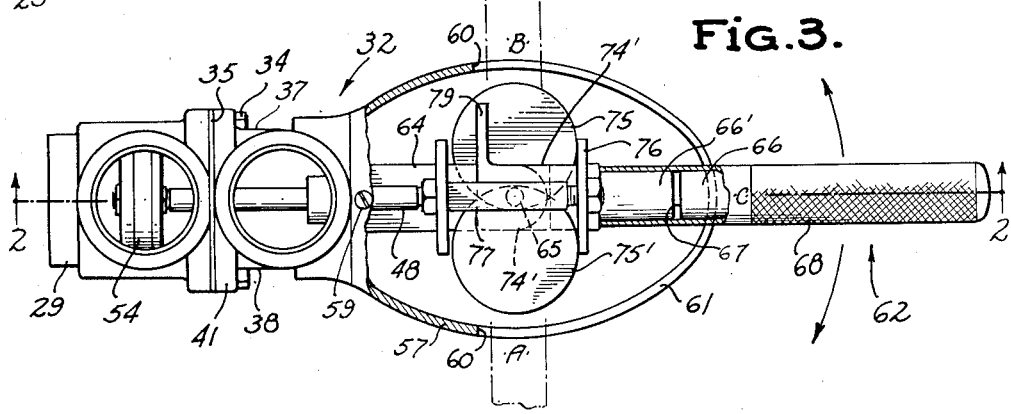
Figure 3 is a side view of the assembly, partly in section taken in the direction of the arrow 3 of Figure 2, with the valve bodies in the same position shown in Figure 2.
Figure 4:
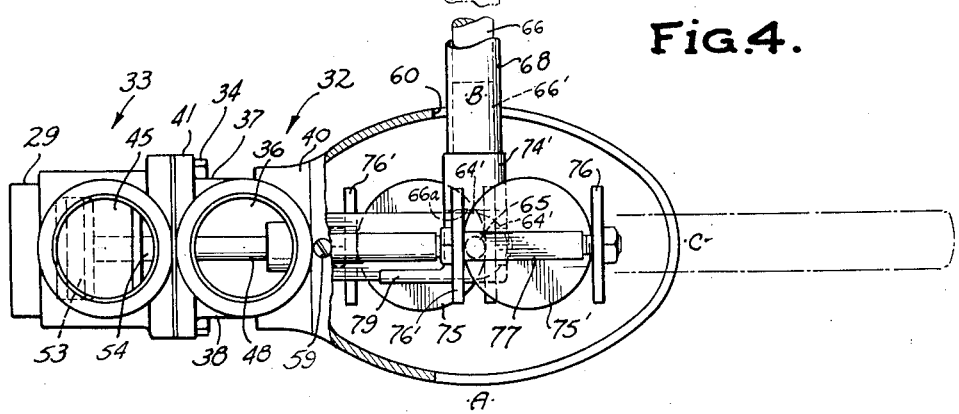
Figure 4 is another side view of the assembly with the valve bodies in position for filtering the pool. This position is shown diagrammatically in Figure 5.

The rightward casting 32 as viewed in Figures 2, 3 and 4, has a single chamber 36 bounded by a top wall 37, a bottom wall 38, a far end wall 39, a rightward arched side wall 40 and a planar side wall 41. The near end of the casting is shaped to provide a circular boss 21, which is threaded to receive a pipe. The side wall 41 has two circular openings 42 and 43, which constitute ports from chamber 36 of casting 32 into the interior of casting 33.

The leftward casting 33 is formed with two chambers 44 and 45 divided by a partition wall 46. Its leftward side wall has two circular bosses 27 and 29, each threaded for a pipe connection and each coaxially disposed with reference to the ports 42 and 43, respectively.

Valve stems 47 and 48 are slidably mounted in a thickened portion 63 of the rightward side wall 40 of casting 32 which is formed with inwardly projecting bosses 49 and 50, in coaxial alinement with the ports 42 and 43, respectively, to provide guides of adequate length for the valve stems. The wall 40 is also provided with the usual liquid seal O rings 51 and 52 for the valve stems. At the leftward end of the valve stems are secured in conventional fashion the valves 53 and 54 respectively, each consisting as shown of a disk-shaped valve body, and a valve seat ring of suitable resilient material fastened on each side of the valve body by a washer and nut threaded on the stem.

When one of the valve stems is in its extreme rightward position, its rightward valve seat ring of the corresponding valve engages the left face of wall 41 of the rightward casting 32 to close the port 42 or 43 as the case may be. The wall 41, thus provides valve seats for the valves 53 and 54. When the stem is in its extreme lefthand position, the lefthand valve seat ring of the corresponding valve engages the right face of the associated one of the annular flanges 55 and 56 which are formed on the casting 33 just within bosses 27 and 29, respectively, and provide valve seats for the valves when at the left limit of their travel.

The valve stems 47 and 48 are manually manipulated to variously dispose the valves 53 and 54 at either of their extreme limit positions in which they contact their rightward or leftward associated valve seats, or to intermediate positions, by a mechanism designed to convert an arcuate movement of a hand-operated lever to longitudinal movement of the valve stems. This mechanism is enclosed for appearance and protective purposes within a split casing 57. This casing for purposes of assembly is made in two identical open sided shells which are secured to an outwardly thickened portion 63 of the wall 40 of the casting 32 by screws 59. The casing shells are generally elliptical in lateral contour, and are cut away along their juxtaposed edges from the outer end of the casing to points 60 to provide a slotted way 61 for the movement of a manipulating handle 62, as will be presently described. The thickened wall 63 has an integral outwardly extending pedestal 64. In a bore in the outer end of this pedestal is stationarily mounted a pin 65 which extends in each direction beyond the upper and lower side faces of the pedestal sufficiently to afford a pivotal bearing.

The handle 62 has two parts. One part designated by the numeral 66 is a half-round rod from the end of the pedestal 64 to a point 67 from which point to its outer end it is a full-round rod. The other part 66' of the handle is a half-round rod from the end of the pedestal to the point 67 where it terminates. A cylindrical sheath 68 slides upon the rod 66 between two limit positions in which it is releasably held by engagement of the spring pressed detent ball 69, with two small depressions 70 and 71 formed in the sheath. A limit screw 72 prevents accidental removal of the sheath 68 from the rod 66 when the screw engages the inner end 72' of a slot 73 in the side of the sheath 68. When the sheath is in its outer position its inner end clears the outer end of the half-round rod 66', and the handle part 66 may be moved independently of the handle part 66'. When the sheath is in its inner position both handle parts must be moved in unison as one handle. The handle part 66' cannot be moved except by the handle part 66, when the sheath ties the two parts together.

The inner ends of the two handle parts have offset inwardly extending spacers 74 and 74' respectively, which are pivotally mounted on the ends respectively of the pin 65. Integrally connected to the outer faces of these spacers are two circular cams 75, 75' respectively which extend eccentrically from the pin 65. The two cams 75 and 75' extend in diametrically opposite directions of eccentricity. Each cam 75 and 75' is disposed closely between two opposite cam followers 76 which are threadedly fixed in position upon the corresponding valve stem 47 or 48. Each valve stem also has secured upon it, an adaptor 77, rectangular in transverse section. These two adapters hold the cams and the remainder of the lower ends of the handle parts laterally together in proper assembled position.

When the two cams extend in opposite directions across the handle casing as shown in Figure 3, the valves are each halfway between their extreme limit positions. When the handle with its sheath engaging both handle parts, is turned 90 degrees bringing the two cams in such position that they extend in opposite directions lengthwise of the casing, the two valves are, one in its extreme rightward seated position and the other in its extreme leftward seated position as shown in Figure 4.

Referring now, to Figure 1 which illustrates a typical incorporation of the valve assembly just described in a system of fluid containers and reservoirs and connecting conduits, it will be seen that flow control apparatus is concentrated at one point, i. e., the point of installation of the valve assembly structure 20. It will also be seen that by the manipulation by the operator of only one element, i. e., the handle 62, a variety of servicing operations of the pool can be effected. This compares favorably with installations in which a plurality of valves are scattered at separated stations, and must be manipulated by the operator successively, going from one station to the next.

An indicator plate 78 may be attached to the upper face of the casing 57, which bears upon it at its uppermost point the letter "C," at the intersection of its transverse center line passing through the pin 65 and its one side the letter "A," and at the intersection of this centerline with its other side the letter "B." The plate also has marked upon it for the instruction of the operator, directions for the manipulation of the handle 62 with reference to these three points A, B, and C, to provide for properly positioning the valves for a static position and for three sets of flow conditions of the water in the pipes, to accomplish four servicing operations, respectively.

Figure 5:
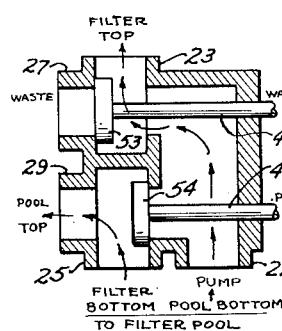
Figure 5 is a diagrammatic view of the valve assembly with the valves in position for pumping water from the swimming pool to and through the filter and back to the pool.

As heretofore pointed out, the position of the handle and valves in Figures 2 and 3, does not correspond with any one of these four conditions, the position being selected for clear illustration of the construction of the valve assembly. Figure 5 depicts diagrammatically the position of the valves for the operation of filtering the water in the pool. By a comparison of the valve stem and valve positions as shown in Figure 5 with the position and connection of the valve assembly 20 as shown in Figure 1, the flow of water may be readily traced from the bottom of the pool to the pump, to the valve assembly, to the top of the filter, down through the filter, from the bottom of the filter to the valve assembly, and from the valve assemby to the top of the pool.

To place the valves in the position shown in Figure 5, if the sheath is not already in its innermost position at which it embraces both handle parts 66 and 66', pull out the sheath, turn the handle part 66 into alined registry with handle part 66', and push the sheath to its inner position. Then turn the handle to position B, as shown in full lines in Figure 4. In this position valve stem 48 and valve body 54 secured thereon, will be moved to and held in their outermost position by the upward swing of the cam 75', and the valve stem 47 and the valve body 53 thereon will be moved to and held in their innermost position by the downward swing of the cam 75. In this position the valves will be seated against their respective corresponding valve seats, with their resilient valve seat rings making a tight contact with the valve seats. In this position of the handles their inner ends 66a will contact the upper side face 64' of the end portion of the pedestal 64, definitely fixing the valve stems in the B position, i. e., the filtering position.

Figure 6:
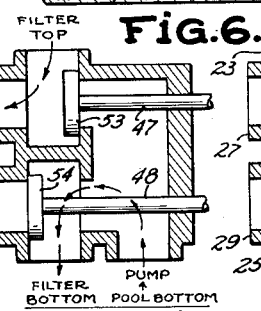
Figure 6 shows the valves in the filter cleaning position.

Figure 6 shows the position for back washing the filter to clean it of accumulated impurities. To place the valve in this position, the two handle parts enclosed within the sheath are moved to the A position.

Figure 7:
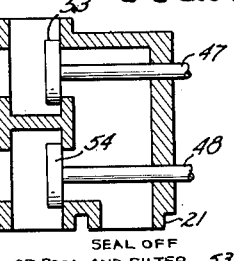
Figure 7 shows the valves in position for sealing off the filter tank from the pump for purposes of cleaning the pump or strainer.

Figure 7 shows the position of the valves for sealing off the filter tank from the pool for preventing flow of water through the pump 16 and strainer 18', when the latter are to be cleaned or adjusted. To place the valves in this position, the two handle parts are moved in unison with the sheath to position B, which seats the valve 54 against its outer seat in the valve deck provided by the wall 41 of the casting 32. The sheath is then pulled outwardly to disengage the handle part 66', and the handle part 66 is then moved independently of handle part 66' through a 180 degree turn to position A. Both cams and their associated valves are then in their outermost position, as shown in Figure 7.

Figure 8:
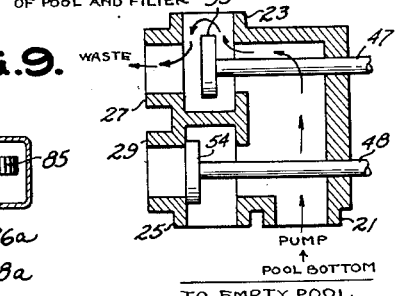
Figure 8 shows the valves in position for draining pool to waste without passing the water through the filter tank.

Figure 8 shows the position of the valves for draining the pool. To place the valves in this position, first move both handles to A, disengage handle part 66' and move handle part 66 to C, which disposes valve 53 halfway between its outer and inner seats as shown in Figure 8. It is understood that the pump will be turned on when the operations illustrated in Figures 5, 6 and 8 are occurring. For assisting the operator in stopping the handle 66 at C, an arm 79 is formed upon the spacer 74' of the cam 75' and projects from this spacer in the opposite direction from the cam 75'. Thus, when the cam is in its inwardly projecting position to place the valve 54 in its innermost position as shown in Figure 8, the arm 79 projects outwardly and acts as a stop to the handle 66 to prevent its movement beyond position C.

The handle parts may be used to place the valves selectively and differentially not only in the four combinations of positions shown in Figures 5, 6, 7 and 8, but in other combinations of positions should such combinations have any utility value. In other than swimming pool installations, the principles of the invention can be utilized, with suitable modifications to provide for many flow conditions called for in the use of the installation.

Figure 9:
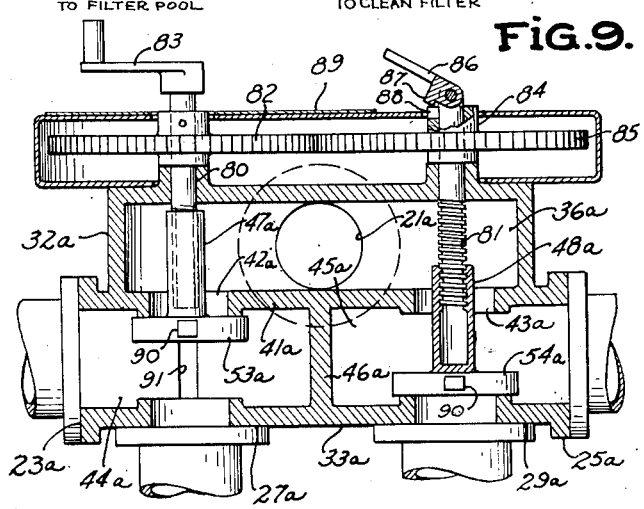
Figure 9 shows the valve assembly of a modified form of the invention for use with valves and connecting conduits of a larger size.

The invention in a modified form is illustrated in Figure 9. This modification of the invention provides for a mechanical advantage to the operator in manipulating the valve stems and valves in installations having pipes, valve ports and valves of larger size, requiring applications of greater longitudinal forces to move the valve stems. The designating numerals on this figure are the same as for corresponding parts of the form of the invention depicted in Figures 2, 3 and 4 with the addition of the suffix $a$.

The valve stems 47a and 48a are internally threaded to receive the threaded rods 80 and 81, respectively. Rod 80 has fixedly secured to its outer potrion a spur gear 82 just outside the valve housing casting 32a. A crank handle 83 is secured to its outer end for the rotation of the rod 80. The rotation of the rod 80 effects the longitudinal movement of the valve stem 47a, which is held against rotation by a key 90 extending through the valve 53a, the two projecting ends of which slidably engage keyways 91 formed in the walls of the valve chamber. Valve stem 48a is similarly held against rotation.

A hub 84 of a spur gear 85 is rotatably sleeved upon the rod 81. The gear wheel 85 meshes with the gear wheel 82. The two gear wheels have the same pitch diameter. To the outer end of the rod 81 is pivoted upon a transverse axis a handle 86 carrying upon its under side a keying lug 87. This lug may be dropped into locking engagement in a keyway 88 in the upper end face of the hub 84, when the key lug and keyway are in radial registry. An indicator plate 89, enables the operator to properly correlate the movements of the two gear wheels.

When one rod 80 or 81 rotates in a clockwise direction, it is obvious that the other rod rotates in an anti-clockwise direction. Thus, as in the other form of the invention, the valve stems, when both are moving, are moving in opposite directions. To cause the valves to assume any desired relationship of positions, the handle 86 should be thrown over into locking position when the valves are in opposite extreme positions, and the handle 83 rotated in the proper direction of rotation until valve 54a is in the desired position. If valve 53a is then not also in the desired position, the locking handle 86 is thrown backward out of locking position, and the handle 83 rotated in the direction and to an extent required to properly position valve 53a.

We claim:

1. A directional control valve for selectively (a) directing fluid flow from a pump connected to a pool outlet to the top of a filter and from the bottom of said filter to a pool, (b) directing fluid flow from the pump to the bottom of the filter and from the top of the filter to waste, (c) directing fluid from the pump to waste, and (d) sealing off the filter from the pump, comprising: a housing, a pump chamber in said housing and a pump fluid inlet port leading thereto, a filter top and waste valve chamber in said housing communicating with said pump chamber via a fluid port having a first valve seat therearound, a waste outlet port leading from said valve chamber alined with said port between said pump chamber and said valve chamber and formed with a second valve seat therearound, a filter-top port in said housing communicating with said valve chamber, a double acting poppet valve in said valve chamber movable between and adapted to seat on either of said valve seats, a filter bottom and pool supply valve chamber in said housing communicating with said pump chamber via a fluid port having a first valve seat therearound, a pool supply outlet port in said housing, unconnected with said waste outlet port, for connection with said pool, said outlet port communicating with said pool supply filter bottom and pool supply valve chamber and alined with said port between said pump chamber and last mentioned valve chamber and formed with a second valve seat therearound, a filter-bottom port in said housing communicating with said filter bottom and pool supply valve chamber, a double acting poppet valve in said last mentioned valve chamber movable between and adapted to seat on either of the two last mentioned valve seats, axially movable stems for moving said poppet valves between said seats, and actuating means operable selectively, first, to move both said valve stems cooperatively to shift either of the double acting valves from its first seat toward its second seat while shifting the other from its second seat toward its first seat, and second, to move one of the valve stems independently of the other to position the corresponding poppet valve in a selected position while the other poppet valve remains in a selected position.

2. The subject matter of claim 1, wherein said actuating means for said valve stems comprise cam followers on said stems, cams engageable with said followers, and unitary handle means selectively operable to rotate both of said cams simultaneously, or one of said cams independently of the other.

3. The subject matter of claim 1 wherein said actuating means for said valve stems comprise a rotatable shaft associated with each stem, means operatively connecting each stem and its associated shaft for axial movement of the stems in one direction by rotation of their associated shafts in one direction and axial movement of the stems in the opposite direction by reversed rotation of their associated shafts, means for rotating one of said shafts, and means for selectively coupling said shafts for simultaneous rotation in directions to cause simultaneous axial movement of the valve stems in opposite directions.

4. The subject matter of claim 3 wherein the last mentioned means comprise a first gear fixed on said one shaft, a second gear journaled on the other shaft and meshing with the first gear, and means for selectively drivably connecting said other shaft and second gear whereby said shafts are simultaneously rotated in opposite directions to cause said simultaneous opposite axial movement of the stems.

5. In a fluid flow device, the combination of: a housing providing a plurality of ported chambers therein, two relatively movable valve stems, valve means on each of said stems operatively related with associated ones of said ports, a motion transmitting means including a pivotal arm for longitudinally moving each of said stems to selectively vary the functional positions of said valve means with respect to their associated ports, the pair of arms of said motion transmitting means having a common pivotal axis, and coupling means on one of the arms for selectively disengageably coupling said pair of arms whereby said arms may be operated simultaneously to simultaneously move said stems or one of said arms may be operated to move its respective stem while the other arm and stem remain stationary.

6. The subject matter of claim 5 wherein said arms are proximately disposed and said coupling means comprises a movable coupling element on one arm selectively engageable with the other arm for releasably locking said arms together for simultaneous pivotal movement.

7. The subject matter of claim 6 wherein one of said arms is longer than the other, said coupling element comprising a sleeve on the longer arm and slidable inwardly thereon to embrace the other arm.

8. The subject matter of claim 5 wherein said valve stems are parallel and said motion transmitting means additionally includes means converting angular movement of one arm in a first direction into movement of its valve stem in a predetermined first longitudinal direction, and angular movement of said last mentioned arm in a second and opposite direction into movement of its stem in a second and opposite longitudinal direction, and means converting angular movement of the other arm in said first direction into movement of the associated valve stem in the said second longitudinal direction and angular movement of the latter arm in the said second direction into movement of the associated valve stem in the first longitudinal direction.

References Cited in the file of this patent

UNITED STATES PATENTS

| Number | Name | Date |
|---|---|---|
| 894,411 | Vincent | July 28, 1908 |
| 979,532 | Merrill | Dec. 27, 1910 |
| 1,400,424 | Derby | Dec. 13, 1921 |
| 1,856,903 | Barrett | May 3, 1932 |
| 1,860,927 | Eisenhaur | May 31, 1932 |
| 1,921,092 | Newton | Aug. 8, 1933 |
| 2,040,663 | Mallet | May 12, 1936 |
| 2,145,575 | Zwickl | Jan. 31, 1939 |
| 2,173,210 | Lieb | Sept. 19, 1939 |
| 2,240,163 | Peck | Apr. 29, 1941 |
| 2,265,260 | Argo | Dec. 9, 1941 |
| 2,380,836 | Gottlieb | July 31, 1945 |
| 2,472,309 | Opsahl | June 7, 1949 |
| 2,551,442 | Kuhlman | May 1, 1951 |

FOREIGN PATENTS

| Number | Country | Date |
|---|---|---|
| 74,468 | Austria | of 1918 |